United States Patent [19]

Satomi

[11] 4,344,695

[45] Aug. 17, 1982

[54] METHOD AND APPARATUS FOR SLITWISE EXPOSURE OF PHOTOSENSITIVE MEMBER IN COPYING MACHINES

[75] Inventor: Toyokazu Satomi, Yokohama, Japan
[73] Assignee: Ricoh Company, Ltd., Tokyo, Japan
[21] Appl. No.: 143,005
[22] Filed: Apr. 23, 1980
[30] Foreign Application Priority Data

Apr. 25, 1979 [JP] Japan ................................ 54/051186

[51] Int. Cl.³ ...................... G03G 15/28; G03B 27/32
[52] U.S. Cl. .......................................... 355/8; 355/11; 355/66; 355/77; 430/31
[58] Field of Search ......................... 355/8, 11, 66, 77; 430/31

[56] References Cited

U.S. PATENT DOCUMENTS

3,709,602 1/1973 Satomi .............................. 355/11 X
3,869,204 3/1975 Wilby .................................. 355/8 X
4,212,532 7/1980 Suzuki ................................ 355/8 X
4,232,960 11/1980 Glab .................................. 355/11 X

*Primary Examiner*—Richard L. Moses
*Attorney, Agent, or Firm*—Wyatt, Gerber, Shoup, Scobey & Badie

[57] ABSTRACT

A glass pane on which an original is placed and a focusing lens are stationary in the space of a copying machine. An original to be copied is placed on the glass pane in planar form. A pair of reflecting mirrors disposed on the image side of the focusing lens successively reflect exposing light flux from the focusing lens to pass it onto an exposure station on the photosensitive member. The surface of the photosensitive member moves in a given direction at a uniform rate while the pair of reflecting mirrors move in independent directions to achieve a slitwise exposure of the photosensitive member at a given location.

21 Claims, 14 Drawing Figures

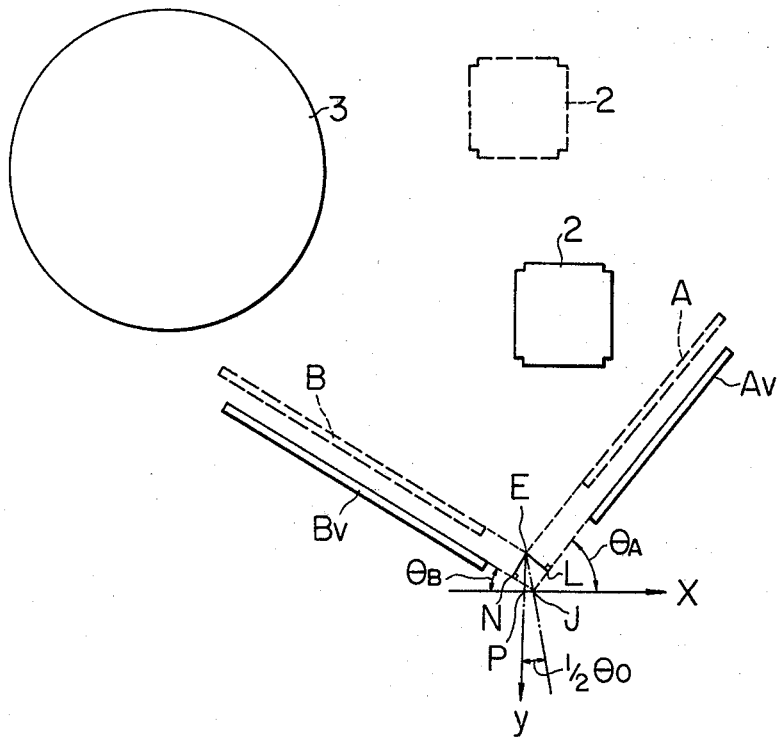

METHOD AND APPARATUS FOR SLITWISE EXPOSURE OF PHOTOSENSITIVE MEMBER IN COPYING MACHINES

BACKGROUND OF THE INVENTION

This invention relates to a method and an apparatus for slitwise exposure of a photosensitive member in copying machines.

An exposure system is known in which an original to be copied is placed stationarily in planar form and a slitwise exposure of a photosensitive member with a light image of the original takes place at a given location by moving the surface of the photosensitive member in a given direction at a uniform rate.

The present inventor has previously proposed a method of slitwise exposure for a photosensitive member in which the surface of a focusing lens which is located on the object side is disposed in direct opposing relationship with a glass pane on which an original is placed, while a pair of reflecting mirrors are disposed on the image side of the focusing lens and are moved to effect a slitwise exposure of the photosensitive member (Japanese Laid-Open Patent Application No. 102,041/1978).

The present invention relates to an improvement of the method disclosed in this previous application. Reference is now made to FIGS. 1 and 2 to provide a brief summary of the disclosed method and related problems which are to be overcome by the present invention.

Referring to FIG. 1, there is shown a glass pane 1 on which an original is placed in planar form, with its surface carrying figures and characters facing down. The glass pane is stationary in a copying machine. A focusing lens 2 is disposed below the central region of the glass pane 1 so that its optical axis is perpendicular to the plane of the glass pane. The focusing lens is held stationary in the machine, and remains stationary except for its displacement which is required in changing the magnification when the copying machine is of a variable magnification type.

A pair of reflecting mirrors A, B are disposed on the image side of the focusing lens 2, and each comprises a plane mirror of a rectangular form with its length extending in a direction perpendicular to the plane of the sheet of drawing. These mirrors have specular surfaces AM, BM which are disposed at given angles with respect to the plane of the glass pane 1 and at a given angle relative to each other so that the specular surfaces are disposed opposite to each other. When light from the original placed on the glass pane 1 impinges on the focusing lens 2, part of the imaging flux from the lens is successively reflected by the specular surfaces AM and BM onto the photosensitive member 3. The positions of the reflecting mirrors A, B are chosen such that the part of imaging flux is focused slitwise on the peripheral surface of the photosensitive member at a slitwise exposure station $S_L$ which represents a given location in the space of the machine. The slitwise exposure station $S_L$ is defined by a slit member, not shown.

The design of the slitwise exposure station $S_L$ determines the width $S_S$ of a slit-shaped portion of the original which is being scanned. Specifically, when the plane mirrors A, B are in their start positions shown in solid lines, the images of a slit width $S_S$ of the original at the leftmost portion of the glass pane 1 are projected onto the slitwise exposure station $S_L$.

The reflecting mirrors A, B are driven integrally to move in a direction indicated by an arrow C at a uniform rate. In a corresponding manner, successive portions of the original are focused onto the slitwise exposure station $S_L$ of the photosensitive member 3, and when the reflecting mirrors A, B reach their stop positions shown in phantom lines, the rightmost portion of the original corresponding to the slit width $S_S$ is projected onto the slitwise exposure station $S_L$. In other words, as the reflecting mirrors A, B move in an integral manner, the image of the original moves across the slitwise exposure station $S_L$. Hence, by rotating the photosensitive member 3 in a direction indicated by an arrow and at a rate which corresponds to the speed of movement of the image, the photosensitive member 3 is slitwise exposed to form a latent image thereon which corresponds to the original.

In FIG. 1, point $K_O$ at the left-hand end of the glass pane 1 represents the starting point of the scanning of the original, and corresponds to a point $K_1$ where the exposure is started in the slitwise exposure station $S_L$.

The original scanning slit moves in a direction indicated by an arrow D through a distance of $S_S + S_O$ where $S_O$ represents the effective length of the glass pane 1. The movement of the original scanning slit through such distance scans a region of the original having a length $S_O + 2S_1$ which will be hereinafter referred to as an effective copying region. During the time the slitwise scanning of the original takes place, the effective copying region may be entirely illuminated with a given illumination distribution or may be slitwise illuminated by an associated illumination system in timed relationship with the slitwise scanning of the original.

The distribution of illumination is chosen to satisfy the requirement that a portion of the photosensitive member 3 which defines the exposure station is entirely exposed under the same optical conditions. The requirement remains unchanged if the slitwise illumination is utilized. The lengthwise distribution of illumination which is obtained from a slit-shaped illuminating unit may be made to be a desired one by regulating the light emitting intensity of an illuminating lamp, or by controlling the amount of light emitted by an illuminating light in accordance with the movement of the slitwise illuminating assembly.

The described slitwise exposure technique is applicable to a copying machine of a variable magnification type, since the displacement of the reflecting mirrors A, B which is required in changing the magnification is in one dimension to enable such displacement to be achieved with a relatively simple mechanism, and since the speed of movement of reflecting mirrors which is required to effect the slitwise exposure of the photosensitive member remains unchanged regardless of the magnification.

The imaging flux which exposes the photosensitive member 3 changes its position on the reflecting mirrors A, B in a direction perpendicular to the length of the mirrors and parallel to the specular surfaces, as the reflecting mirrors A, B move. This explains why the reflecting mirrors A, B require a width as indicated in FIG. 1 even though the width of the imaging flux which participates in the slitwise exposure has a reduced width. As will be apparent from FIG. 1, the reflecting mirror B has an increased width for its specular surface, though the corresponding width is not as great for the reflecting mirror A. The described slitwise exposure technique suffers from the problem that the reflecting mirror B having such an increased size must be moved adjacent the photosensitive member 3. Another problem results when the exposure technique is applied to a copying machine of a variable magnification type since in this instance the reflecting mirror A as well as the reflecting mirror B must have an increased width for its specular surface. This will be considered in more detail with reference to FIG. 2.

In FIG. 2, the focusing lens 2 and the reflecting mirrors A, B in their start positions are shown in chain lines when the magnification is unity. They are shown in solid lines and broken lines corresponding to the start and the stop positions when a magnification other than unity is utilized. The position of the focusing lens 2 which it assumes when the magnification is different from unity is shown in solid line. It is to be noted that the orientation of the focusing lens 2 and the reflecting mirrors A, B for a magnification other than unity remain the same as shown in FIG. 1. As will be apparent from comparison with FIG. 1, the reflecting mirror A as well as the reflecting mirror B needs an increased width for its specular surface.

To facilitate the understanding of the invention which will be described later, the displacement of the focusing lens system 2 and the reflecting mirrors A, B as magnification is changed will be considered.

To this end, x- and y-axis will be chosen as shown. Specifically, the x-axis lies in the plane of the drawing and extends parallel to the plane of the glass pane 1 while the y-axis is parallel to the optical axis of the focusing lens 2. A direction which is perpendicular to the plane of the sheet of the drawing will be designated as the z-axis. A displacement of the focusing lens 2 which occurs as a magnification is changed will be represented by $x_h$, $y_h$ and $z_h$ which represents the x-, y- and z-axis component thereof. In a similar manner, a displacement of the reflecting mirrors A, B will be represented by their x- and y-axis components $x_M$, $y_M$. It is to be noted that the component $z_h$ is not shown in FIG. 2. The displacement of the mirrors A, B is represented by $\delta_O$. Obviously, $\delta_O = \sqrt{x_M^2 + y_M^2}$.

A displacement of the focusing lens 2 in the direction of the x-axis is required to maintain the same positional relationship between the original scan start point $K_O$ and the exposure start point $K_1$ as between when the magnification is unity and when the magnification is not unity. A displacement of the focusing lens 2 in the direction of the z-axis is necessary in order to maintain the marginal edge of an electrostatic latent image formed on the photosensitive member 3, as viewed in the direction of the z-axis, when the magnification is not unity in alignment with that formed when the magnification is unity.

A simple geometooptical calculation yields:

$$x_h = \frac{1-m}{1+m} \cdot x_k$$

$$y_h = \frac{f}{m} - f$$

$$z_h = \frac{1-m}{1+m} \cdot z_k$$

$$x_M = \frac{f}{2m}(m-1)^2 \cdot \tan\left(\frac{\theta_0}{2}\right)$$

-continued $$y_M = \frac{f}{2m}(m-1)^2 = \frac{x_M}{\tan\left(\frac{\theta_0}{2}\right)}$$

where m represents a magnification, that is, the ratio of the size of a copy to the size of the original, $x_k$ the distance between the scan start point $K_O$ and the optical axis, $\theta_O$ an angle which a ray of light passing through the optical axis of the focusing lens 2 forms with the y-axis at its point of impingement on the photosensitive member, f the focal length of the lens 2, and $z_k$ one-half the effective width of the glass pane 1 in the direction of the z-axis. It will be seen that the angle $\theta_O/2$ represents an angle formed between the direction C of movement of the reflecting mirrors A, B and the x-axis, and is also equal to the angle between the direction of displacement of the reflecting mirrors A, B which is necessary to effect a change in the magnification and the y-axis.

The displacement of the reflecting mirrors A, B is given by the following expressions:

$$S_M = (S_O + S_S)/2 \cos(\theta_O/2),$$

$$S_{MO} = m(S_O + S_S)/2 \cos(\theta_O/2)$$

where $S_M$ represents the displacement for a magnification of unity and $S_{MO}$ the displacement for a magnification other than unity.

Assuming that the reflecting mirrors A, B move with a speed $V_M$ which remains unchanged when the magnification is varied and that the peripheral surface of the photosensitive member 3 moves with a speed $V_O$, we have $$V_M = V_O/2 \cos(\theta_O/2)$$

Another problem inherent in the conventional arrangements is the fact that the direction in which the reflecting mirrors A, B move is fixed, resulting in a reduced freedom in the design of the apparatus.

SUMMARY OF THE INVENTION

It is an object of the invention to provide a method of slitwise exposure for a photosensitive member which permits the use of a pair of reflecting mirrors disposed on the image side of a focusing lens and having a reduced surface areas for their specular surfaces and which affords a greater freedom in the design of a copying machine.

It is another object of the invention is to provide an apparatus for carrying out the described method of slitwise exposure.

It is a further object of the invention to provide a method of slitwise exposure for a photosensitive member in copying machines in which a greater freedom is afforded in the design of a copying machine without requiring an increased specular surface areas for the pair of reflecting mirrors while utilizing the same speed of movement for the pair of reflecting mirrors.

It is still another object of the invention to provide an apparatus for carrying out the method of slitwise exposure described in the immediately preceding paragraph.

Of the problems pointed out above, the increased width for the specular surface of the reflecting mirrors A, B results from a translational motion of the reflecting mirrors A, B in an integral manner. It is a feature of the invention that the reflecting mirrors A, B undergo a translational motion in different directions. This permits the width of the specular surfaces of the reflecting mirrors to be reduced from that encountered in the prior art. In certain circumstances, the travel or the distance through which they are moved can be reduced, thus enabling the speed of movement to be reduced. In this manner, the application of the invention enables a reduction in the size of the reflecting mirrors A, B. Since the reflecting mirrors A, B move in different directions, a greater freedom is afforded in the design of a copying machine. Additionally, by a suitable choice of the directions in which the reflecting mirrors A, B move, the travel as well as the speed of movement of these mirrors may be made equal to each other, whereby they can be driven with a common drive mechanism.

Above and other objects, features and advantages of the invention will appear more fully from the following description with reference to the drawings.

BRIEF DESCRIPTION OF THE DRAWINGS

In the drawings:

FIG. 5 is a schematic illustration to explain the operation of the embodiment shown in FIG. 4.

FIG. 6 is another illustration demonstrating the effect achieved by the embodiment shown in FIG. 4.

It is to be understood that corresponding parts are designated by like reference characters throughout the drawings unless confusion is likely.

DESCRIPTION OF EMBODIMENTS

Figure 3:
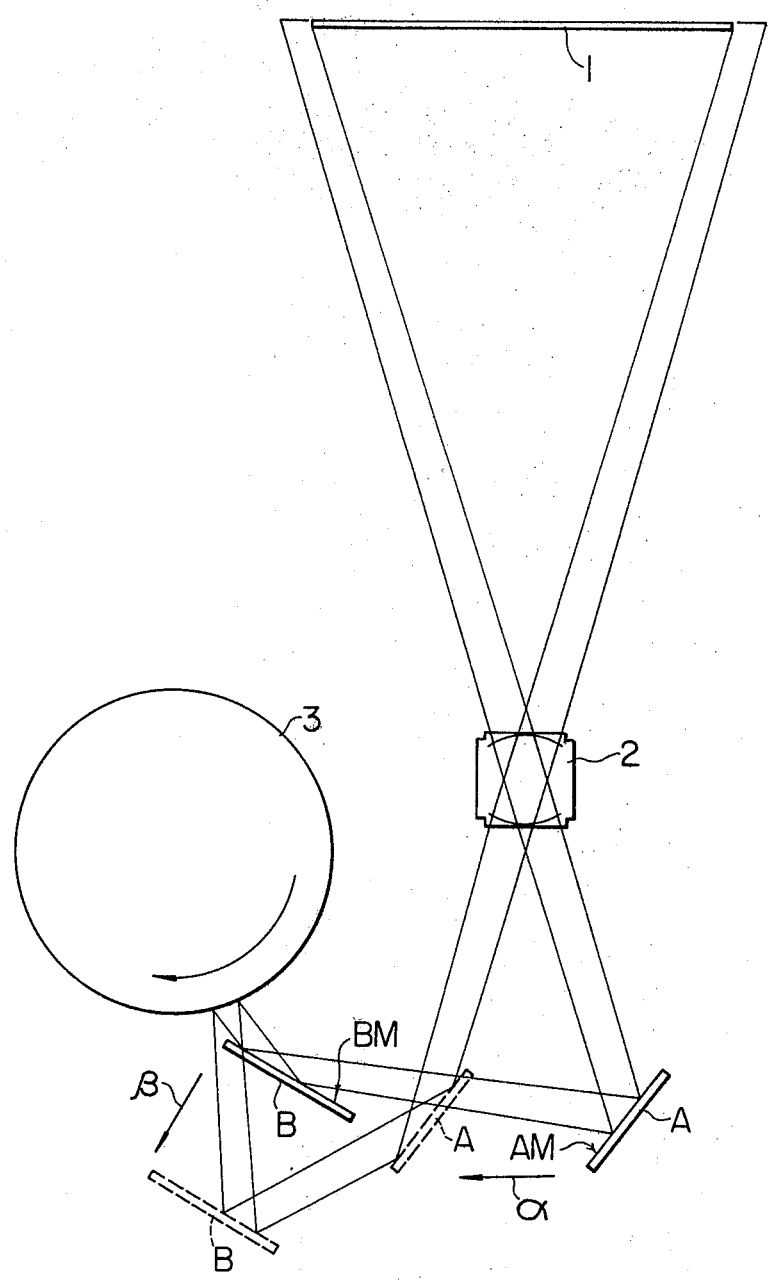
FIG. 3 is a schematic front view of one embodiment of the invention.

Referring to FIG. 3, there is shown an embodiment of the invention in which the direction in which a reflecting mirror A moves is indicated by the character $\alpha$ and is parallel to the plane of a glass pane 1 on which an original is placed. The direction in which a reflecting mirror B moves is indicated by the character $\beta$ and is perpendicular to the specular surface BM thereof. The reflecting mirrors A, B move in the directions $\alpha$ and $\beta$, respectively, with given speeds from their positions shown in solid lines to their positions shown in broken lines, thereby effecting a slitwise exposure of a photosensitive member 3 which rotates in a direction indicated by an arrow.

The travel and the speed of movement of the reflecting mirrors A, B will be described later, but as compared with the arrangement shown in FIG. 1, it will be noted that the reflecting mirrors A, B, in particular, the reflecting mirror B has a greatly reduced width for its specular surface.

As mentioned previously, the conventional arrangement shown in FIG. 1 is suitabe for use with a copying machine of a variable magnification, but the exposure method of the invention is also suitable for use with a copying machine of a variable magnification. When the invention is used in this manner, the specular surface area of the reflecting mirror B can be considerably reduced as compared with the conventional arrangement.

Figure 4:
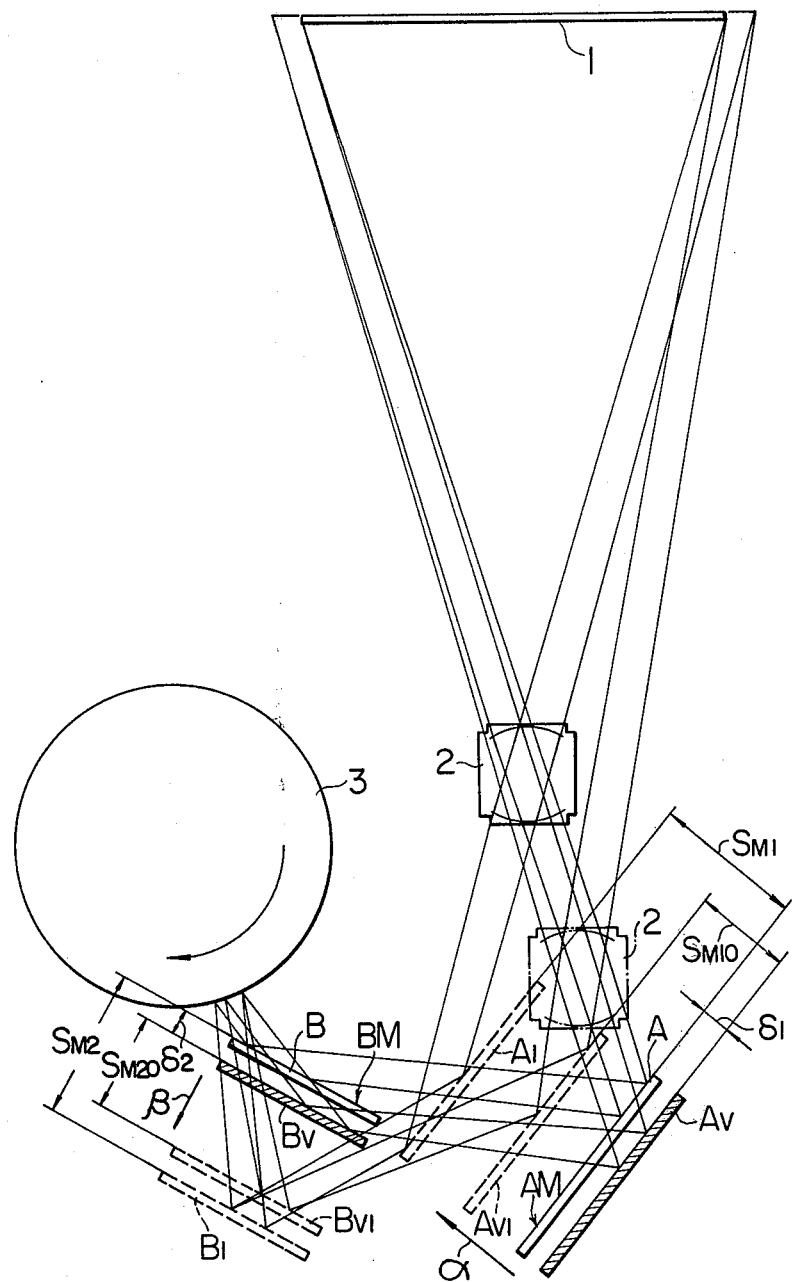
FIG. 4 is a schematic front view of another embodiment of the invention.

Referring to FIG. 4, there is shown the application of the invention to a copying machine of a variable magnification. In this instance, the directions $\alpha$, $\beta$ in which the reflecting mirrors A, B move are chosen to be perpendicular to the specular surfaces AM, BM, respectively. Specifically, the reflecting mirror A moves toward the photosensitive member 3 in a direction perpendicular to the specular surface AM thereof while the reflecting mirror B moves away from the photosensitive member 3 in a direction perpendicular to the specular surface BM thereof, thus accomplishing a slitwise exposure. To avoid confusion, the reflecting mirrors A, B during the time when the magnification is changed will be designated by characters $A_v$, $B_v$. As required, these reflecting mirrors in their stop positions will be designated by characters $A_l$, $B_l$, $A_{vl}$, $B_{vl}$. By comparison with FIG. 2, it will be noted that the width of the specular surface of the reflecting mirror B is greatly reduced.

The travel of the reflecting mirrors A, B will be designated by characters $S_{M1}$, $S_{M2}$ for a magnification of unity, and by characters $S_{M10}$, $S_{M20}$ for a magnification other than unity. The displacement of these mirrors which is required to change the magnification will be designated by characters $\delta_1$, $\delta_2$. These quantities will be considered in general terms. The optical arrangement shown in FIG. 2 will be considered. Thus, FIG. 5 shows the position of the reflecting mirrors A, B of FIG. 2 in their start and stop positions as well as their relationship with respect to the focusing lens 2 and the photosensitive member 3. It is to be noted that the illustration of FIG. 5 is for a magnification of unity.

Considering first the travel $S_{M1}$, $S_{M2}$ (see FIG. 4), the travel $S_{M1}$ is equal to the distance between the start and the stop position of the specular surface of the reflecting mirror A shown in FIG. 5 while the travel $S_{M2}$ is equal to the distance between the start and the stop position of the specular surface of the reflecting mirror B. Designating a point of intersection between the extensions of the specular surfaces of the reflecting mirrors A, B in their start positions by E, and similarly a point of intersection between these extensions at the stop positions of the reflecting mirrors by G, a perpendicular line is drawn from each of the point E, G to the specular surface of each of the reflecting mirrors A, B, with their intersections designated by characters F, H, respectively. Then, the travels $S_{M1}$, $S_{M2}$ are equal to the length of line segments $\overline{EF}$, $\overline{GH}$, respectively.

As shown, the specular surface AM forms an angle of $\theta_A$ with the x-axis while the specular surface BM forms an angle of $\theta_B$ with the x-axis.

Figure 1:
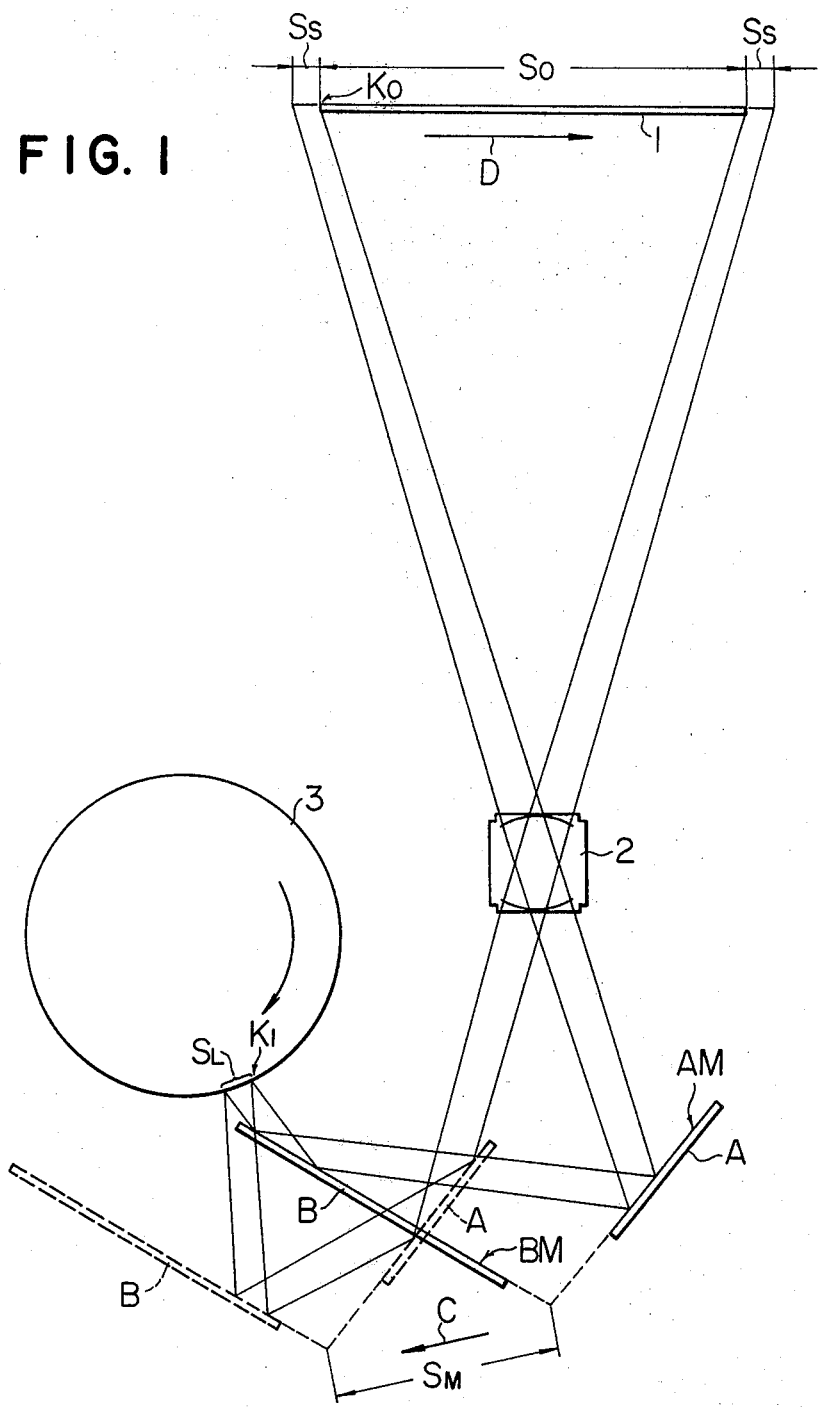
FIGS. 1 and 2 are schematic illustrations showing the arrangement for slitwise exposure of a photosensitive member when a magnification of unity and a magnification other than unity are utilized, respectively.

The length of line segment $\overline{EG}$ is equal to the travel of the reflecting mirrors A, B which move integrally, and thus is equal to the distance $S_M$ shown in FIG. 1. As indicated before.

$$EG = S_M = (S_O + S_S)/2 \cos(\theta_O/2)$$

Figure 2:
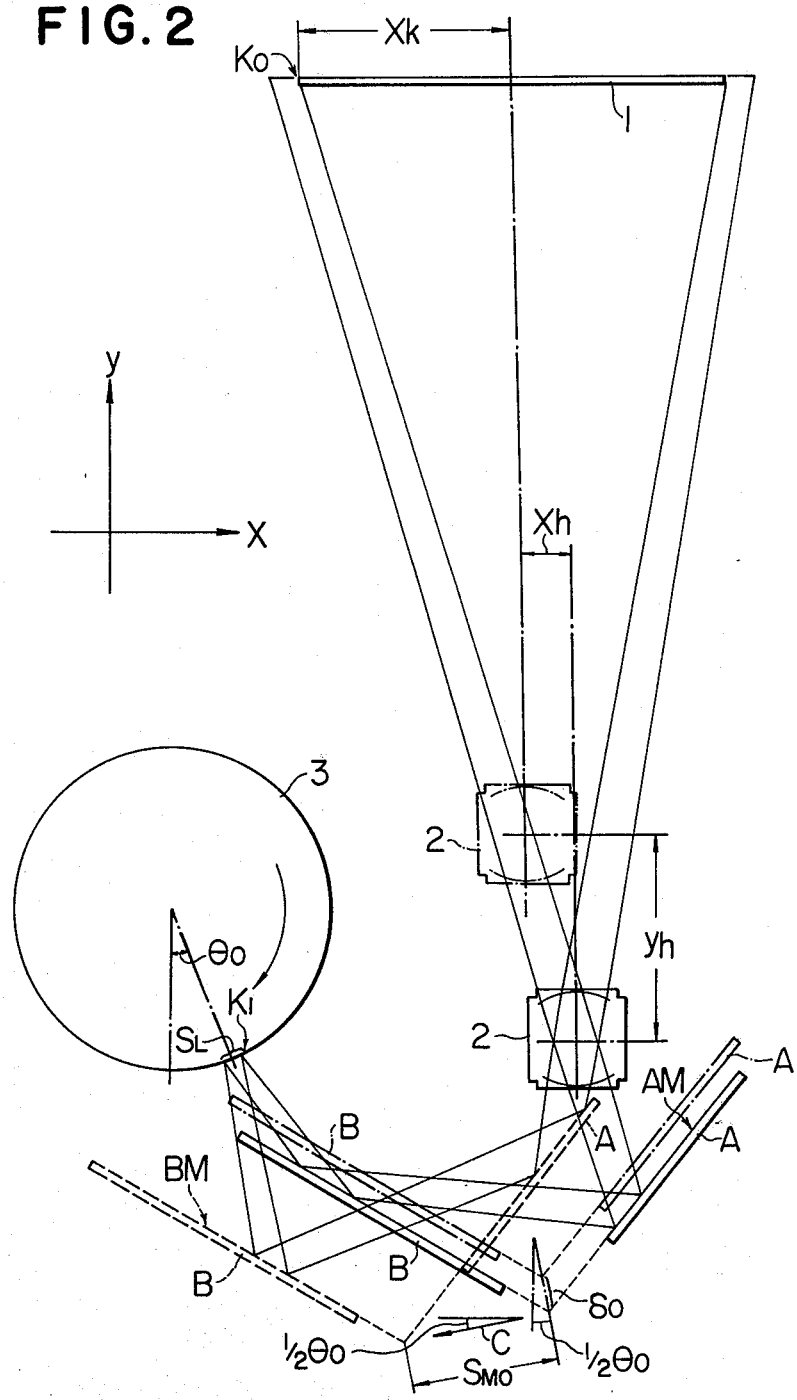

The angle formed between the line segment $\overline{EG}$ and the x-axis is equal to $\theta_O/2$ as will be apparent from FIG. 2. Hence, $\angle EGF$ is equal to $\theta_A - \theta_O/2$. Then, $$S_{M1} = S_M \sin(\theta_A - \tfrac{1}{2}\theta_O) = (S_O + S_S)/2 \cos(\theta_O/2) \cdot \sin(\theta_A - \tfrac{1}{2}\theta_O)$$

Similarly, $\overline{GH}$ or $S_{M2}$ is given as follows:

$$S_{M2} = S_M \sin(\theta_B + \tfrac{1}{2}\theta_O) = (S_O + S_1)/2 \cos(\theta_O/2) \cdot \sin(\theta_B + \tfrac{1}{2}\theta_O)$$

By performing similar calculations for the travels $S_{M10}$, $S_{M20}$ of the plane mirrors $A_v$, $B_v$ when the magnification is changed, we have $$S_{M10} = \frac{m(S_0 + S_S)}{2\cos\left(\frac{\theta_0}{2}\right)} \sin(\theta_A - \tfrac{1}{2}\theta_0)$$

$$S_{M20} = \frac{m(S_0 + S_S)}{2\cos\left(\frac{\theta_0}{2}\right)} \sin(\theta_B + \tfrac{1}{2}\theta_0)$$

FIG. 6 shows the positional relationship between the reflecting mirrors A, B for a magnification of unity (FIG. 2) and the positional relationship between the reflecting mirrors for a magnification other than unity. By comparison with FIG. 2, it will be readily apparent that line segment $\overline{EJ}$ is equal to $\delta_O$ shown in FIG. 2. The length of line segment $\overline{EP}$ represents the y-axis component of a displacement of the reflecting mirrors as the magnification is changed. Thus, $$Y_M = (f/2m)(m-1)^2$$

Hence we have
$$\delta_O = \overline{EJ} = Y_M/\cos(\theta_O/2)$$

The displacements $\delta_1$, $\delta_2$ of the reflecting mirrors in the embodiment of the invention shown in FIG. 4 are given by the length of line segments $\overline{EL}$, $\overline{EN}$. As will be apparent, $\angle LEJ = \theta_A - \theta_O/2$, and $\angle NEP = \theta_B$. Hence, $\delta_1$ and $\delta_2$ can be obtained as follows:

$$\delta_1 = \frac{Y_M}{\cos\left(\frac{\theta_0}{2}\right)} \cdot \cos\left(\theta_A - \frac{\theta_0}{2}\right)$$

$$\delta_2 = \frac{Y_M}{\cos\left(\frac{\theta_0}{2}\right)} \cdot \cos\left(\theta_B + \frac{\theta_0}{2}\right)$$

By repeating a similar process, the speed of movement $V_{MA}$, $V_{MB}$ of the reflecting mirrors A, B in the embodiment of FIG. 4 can be obtained as follows:

$$V_{MA} = V_M \sin(\theta_A - \theta_O/2),$$

$$V_{MB} = V_M \sin(\theta_B + \theta_O/2)$$

By combining these equations with the above expressions for $S_{m1}$ and $S_{M2}$, it will be seen that $$V_{MA} < V_M, \quad S_{M1} < S_M$$

since $\sin(\theta_A - \theta_O/2)$ and $\sin(\theta_B + \theta_O/2)$ cannot exceed unity.

This means that the embodiment shown in FIG. 4 permits a substantial reduction in the width of the specular surface of the reflecting mirror B as well as a reduction in the travel and the speed of movement of the reflecting mirrors as compared with the arrangement shown in FIG. 2.

Figure 7:
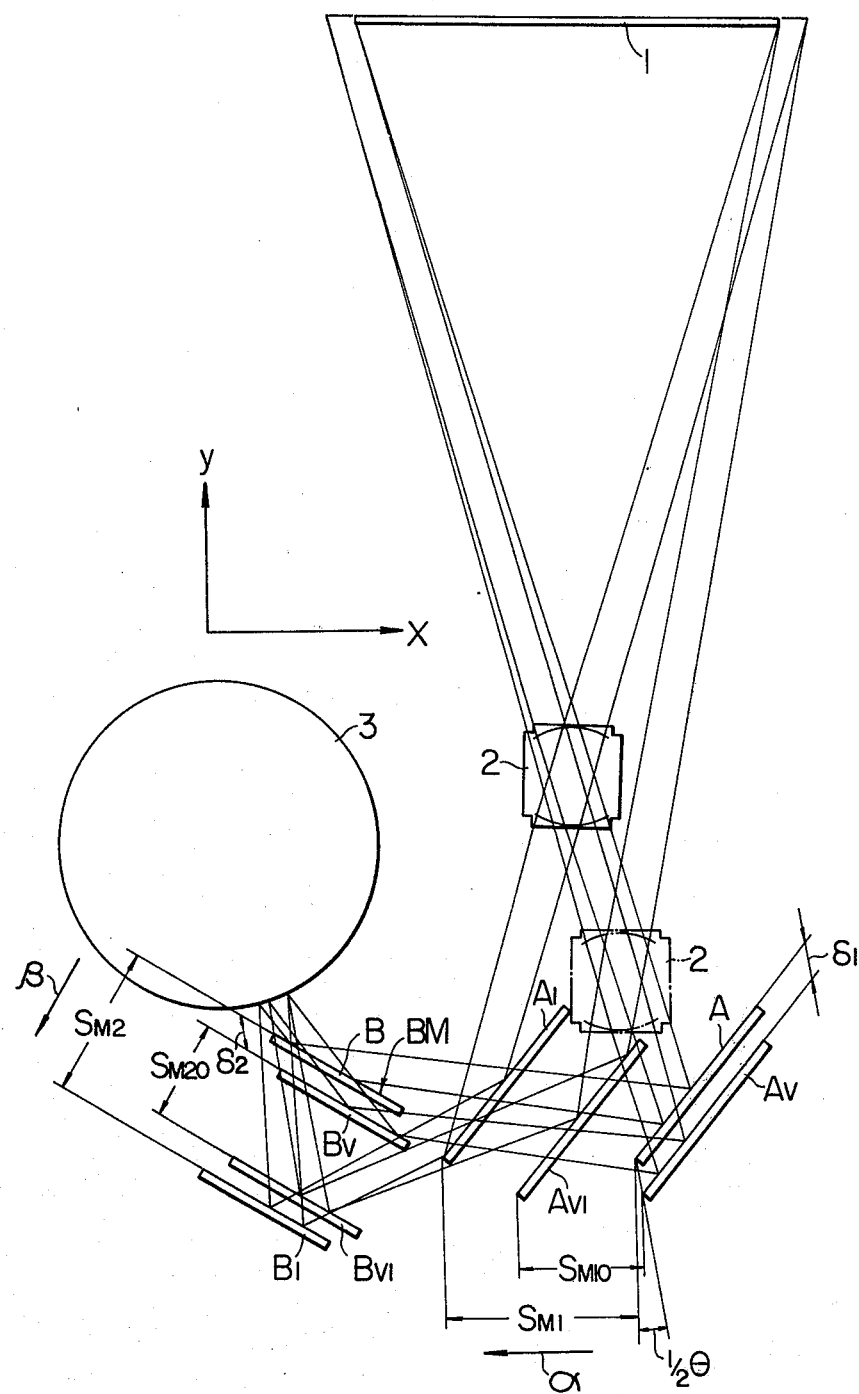
FIG. 7 is a schematic front view of a further embodiment of the invention.
Figure 8:
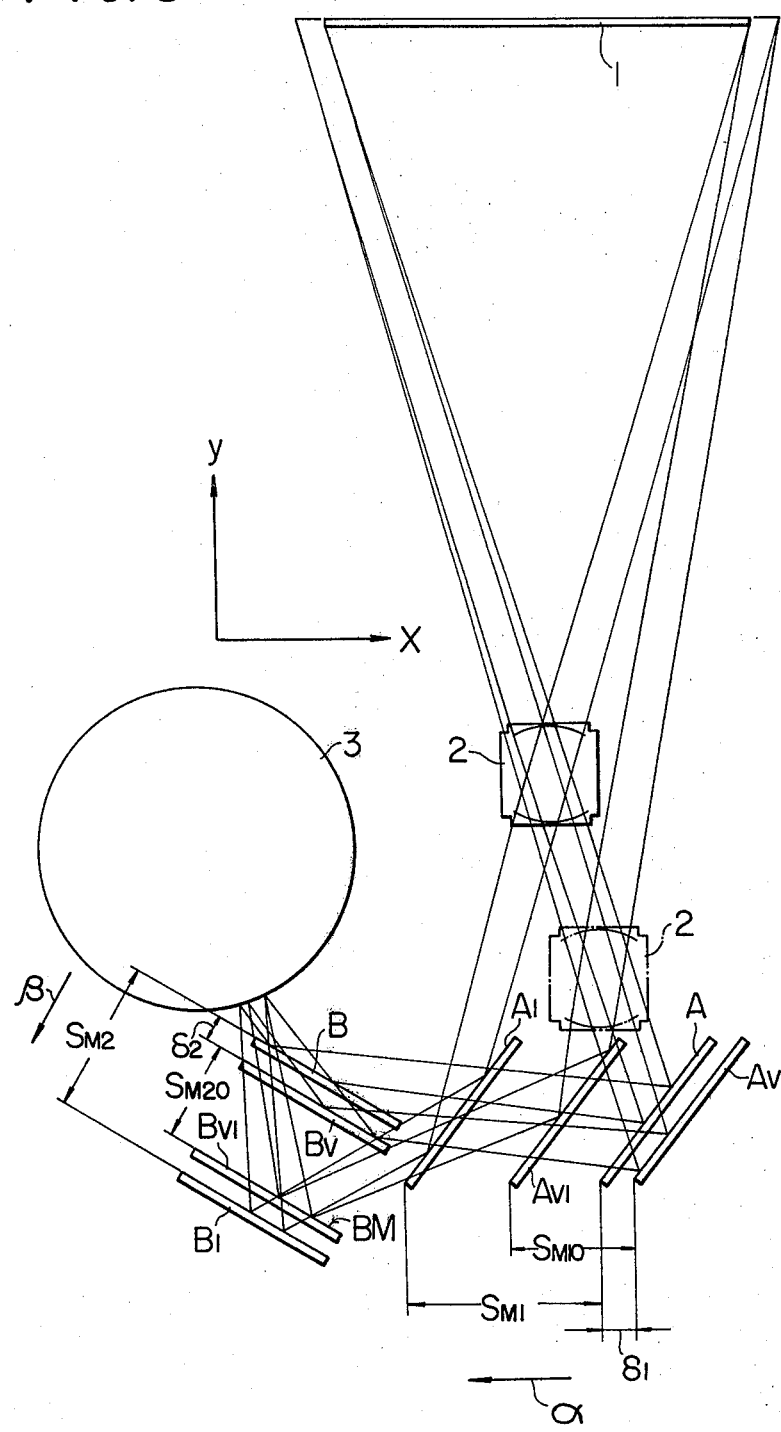
FIG. 8 is a schematic front view of still another embodiment of the invention.

FIGS. 7 and 8 show another embodiment of the invention which represents its application to a variable magnification system as mentioned previously in connection with FIG. 2. In this instance, the direction $\alpha$ of movement of the reflecting mirror A is chosen to be in coincidence with the x-axis or parallel to the glass pane on which an original is placed while the direction $\beta$ of movement of the reflecting mirror B is chosen to be perpendicular to the specular surface BM. For a magnification of unity, the reflecting mirror A moves from its start position designated by character A to its stop position designated by character $A_1$, but for a magnification other than unity, it moves from its start position designated by characters $A_v$ to its stop position designated by characters $A_{v1}$. Similarly, for a magnification of unity, the reflecting mirror B moves from its start position designated by character B to its stop position designated by characters $B_1$, and for a magnification other than unity, it moves from its start position designated by characters $B_v$ to its stop position designated by characters $B_{v1}$.

Referring to FIG. 7, it will be seen that the travels of the reflecting mirror A are given as follows:

$$S_{M1} = \frac{S_0 + S_S}{2} \cdot \left(1 - \frac{\tan\left(\frac{\theta_0}{2}\right)}{\tan\theta_A}\right)$$

$$S_{M10} = \frac{m(S_0 + S_S)}{2} \cdot \left(1 - \frac{\tan\left(\frac{\theta_0}{2}\right)}{\tan\theta_A}\right)$$

The travels $S_{M2}$, $S_{M20}$ of the reflecting mirror B are given as follows:

$$S_{M2} = \frac{(S_0 + S_S)}{2\cos\left(\frac{\theta_0}{2}\right)} \cdot \sin(\theta_B + \tfrac{1}{2}\theta_0)$$

$$S_{M20} = \frac{m(S_0 + S_1)}{2\cos\left(\frac{\theta_0}{2}\right)} \cdot \sin(\theta_B + \tfrac{1}{2}\theta_0)$$

The speed of movement $V_{MA}$, $V_{MB}$ of the reflecting mirrors A, B remains unchanged for a magnification other than unity from their value corresponding to a magnification of unity, and is given as follows:

$$V_{MA} = \frac{V_0}{2\cos\left(\frac{\theta_0}{2}\right)} \cdot 1 - \frac{\tan\left(\frac{\theta_0}{2}\right)}{\tan\theta_A}$$

$$V_{MB} = \frac{V_0}{2\cos\left(\frac{\theta_0}{2}\right)} \cdot \sin\left(\theta_B + \frac{\theta_0}{2}\right)$$

The displacements $\delta_1$, $\delta_2$ of the reflecting mirrors A, B as the magnification is changed can be expressed as follows:

$$\delta_1 = Y_M \cdot 1/\cos(\theta_0/2)$$

$$\delta_2 = Y_M \cdot 1/\cos(\theta_0/2)$$

As shown in FIG. 7, these displacements are in a direction which forms an angle of $\theta_0/2$ with respect to the y-axis, namely, to the right and downwardly.

In the embodiment shown in FIG. 8, the reflecting mirror A is displaced to the right in the direction of the x-axis as the magnification is changed. The displacement $\delta_1$ is given as follows:

$$\delta_1 = Y_M \cdot [1/\tan\theta_A + \tan(\theta_0/2)]$$

On the other hand, the displacement of the reflecting mirror B is in a direction perpendicular to its specular surface BM, and its displacement $\delta_2$ is given as follows:

$$\delta_2 = Y_M \cdot \cos(\theta_B + \theta_0/2)/\cos(\theta_0/2)$$

Quantities such as $S_{M1}$, $SM10$, $S_{M2}$, $S_{M20}$, $V_{MA}$, $V_{MB}$ remain the same as in FIG. 7.

In an embodiment shown in FIG. 9, as the magnification is changed, the plane mirror A is displaced to the right and downwardly, in a direction which forms an angle of $\theta_0/2$ with respect to the y-axis while the plane mirror B is displaced in the direction perpendicular to its specular surface BM, with their displacements $\delta_1$, $\delta_2$ being defined as follows:

$$\delta_1 = Y_M/\cos(\theta_0/2)$$

$$\delta_2 = Y_M \cdot \cos(\theta_B + \theta_0/2)/\cos(\theta_0/2)$$

Quantities such as $S_{M1}$, $S_{M10}$, $S_{M2}$, $S_{M20}$, $V_{MA}$, $V_{MB}$ remain the same as in FIG. 7.

A comparison will now be made in specific terms concerning the width of the specular surfaces, the travel and the speed of movement of the reflecting mirrors A, B among the prior part arrangement shown in FIG. 2, and the embodiments of the invention shown in FIGS. 4, 7, 8 and 9. Values of the travel will be employed which prevail for a magnification of unity, or m=1.

Using specific values $S_O=300$ mm, $S_S=20$ mm, $\theta_O=20°$, $\theta_A=50°$, $\theta_B=30°$ and a changed magnification m=0.647, the specific values of the quantities mentioned above are listed in the table below. However, it is to be understood that approximate values inclusive of certain margins are given for the width of the specular surfaces.

Figure 9:
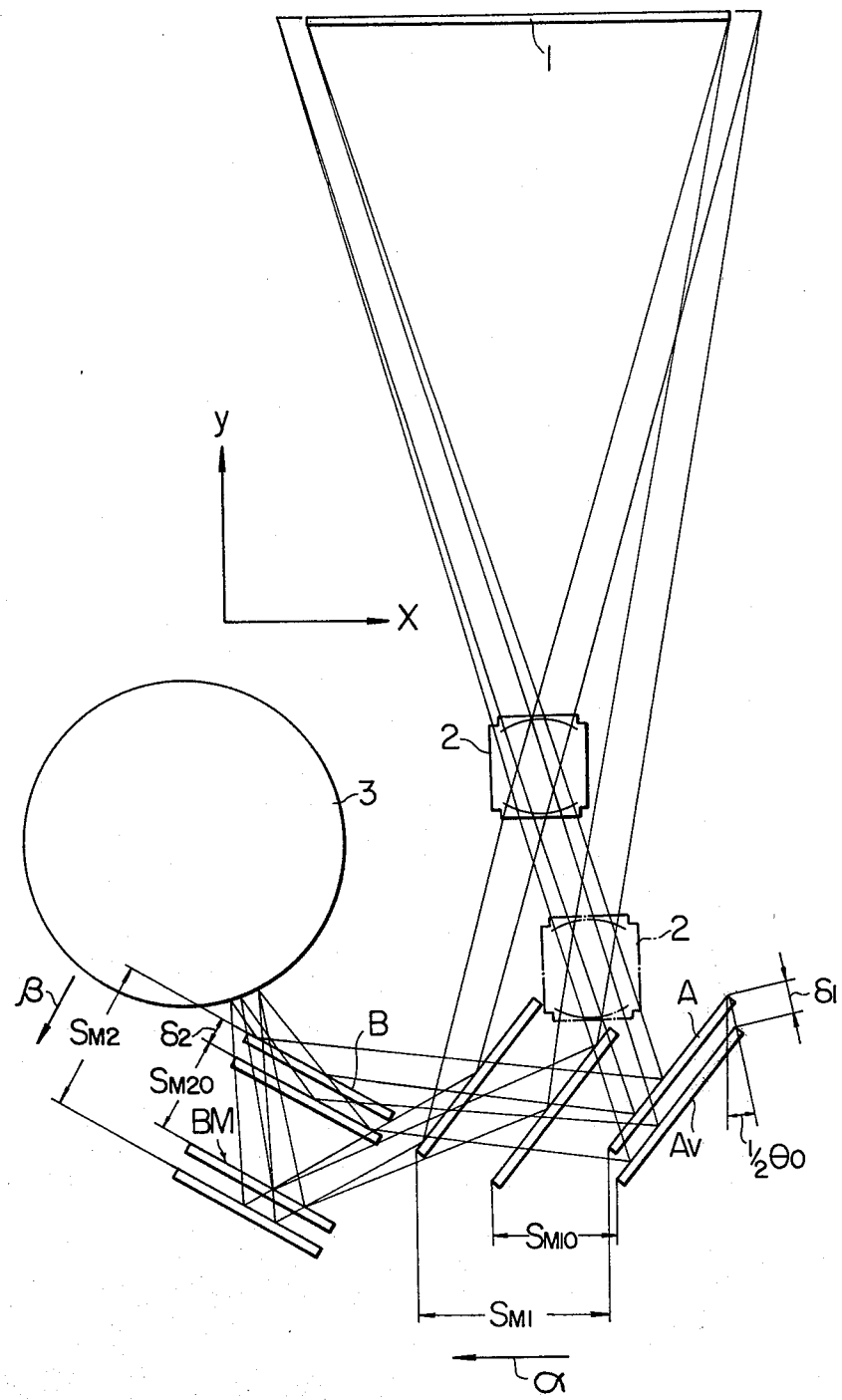
FIG. 9 is a schematic front view of a still further embodiment of the invention.

|  | Plane Mirror A | | | Plane Mirror B | | |
| --- | --- | --- | --- | --- | --- | --- |
|  | Width | Travel | Speed | Width | Travel | Speed |
| FIG. 2 | 150mm | $S_M =$ 162.47mm | 203.9 mm/sec | 215mm | $S_M =$ 162.47mm | 203.09 mm/sec |
| FIG. 4 | 155mm | $S_{M1} =$ 104.43mm | 130.54 mm/sec | 120mm | $S_{M2} =$ 104.43mm | 130.54 mm/sec |
| FIG. 7 | 140mm | $S_{M1} =$ 136.33mm | 173.04 mm/sec | 100mm | $S_{M2} =$ 104.43mm | 130.54 mm/sec |
| FIG. 8 | 130mm | $S_{M1} =$ 136.33mm | 173.04 mm/sec | 120mm | $S_{M2} =$ 104.43mm | 130.54 mm/sec |
| FIG. 9 | 140mm | $S_{M1} =$ 136.33mm | 173.04 mm/sec | 120mm | $S_{M2} =$ 104.43mm | 130.54 mm/sec |

As will be apparent from the Table, the invention has enabled a substantial reduction in the size of the reflecting mirror, in particular, the width of the specular surface of the reflecting mirror B, and also enabled a reduction in the travel of the reflecting mirrors A, B. As the travel is reduced, the speed of movement can be reduced. Conversely, by moving the reflecting mirrors with the speed which is utilized in the conventional arrangement, the slitwise exposure of the photosensitive member can be achieved more rapidly, substantially improving the copying efficiency.

Figure 10:
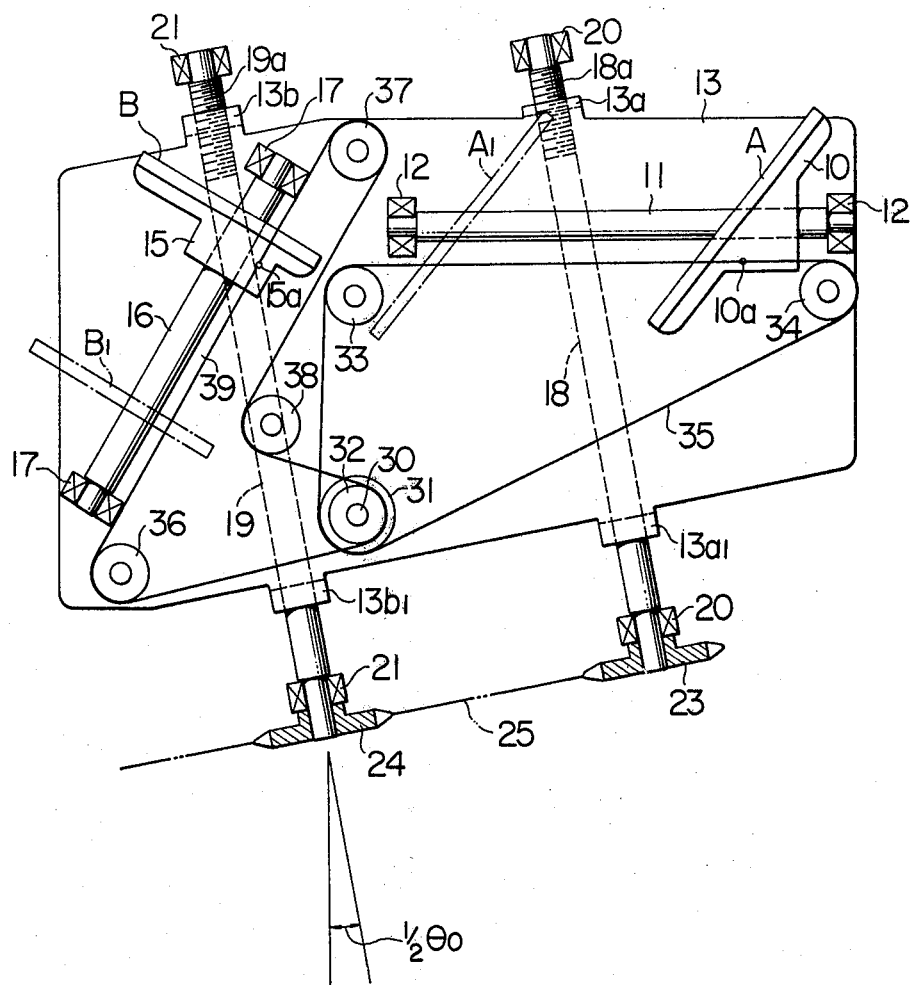
FIG. 10 is a front view of a reflecting mirror translating mechanism which is used in the embodiment shown in FIG. 7.

FIG. 10 shows a mechanism to cause a movement and a displacement of the plane mirrors A, B for the embodiment shown in FIG. 7. Referring to FIG. 10, the reflecting mirror A is secured to a bracket 10 which is slidably mounted on a guide bar 11, which is in turn fixedly mounted on a side plate 13 by means of supports 12. In a similar manner, the reflecting mirror B is secured to a bracket 15 slidably mounted on a guide bar 16 which is in turn fixedly mounted on the side plate 13 by supports 17. The side plate 13 is located adjacent one end, as viewed lengthwise, of the reflecting mirrors A, B, but it should be understood that another side plate is located adjacent the other end of the mirrors to form a pair which carry the brackets 10, 15 therebetween. The guide bar 11 guides the movement of the reflecting mirror A in a direction parallel to the x-axis shown in FIG. 7 while the guide bar 16 guides the movement of the reflecting mirror B in a direction perpendicular to the specular surface thereof. A plurality of pulleys 33, 34, 36, 37, 38 are rotatably mounted on the side plate 13. A drive shaft 30 which causes a movement of the reflecting mirrors A, B is mounted on the side plate, and is driven through a flexible joint. A pair of drive pulleys 31, 32 are fixedly mounted on the drive shaft 20, and a wire 39 extends around the drive pulley 32 and the pulleys 36, 37, 38 while another wire 35 extends around the drive pulley 31 and the pulleys 33, 34. The wire 35 is fixedly connected with a locking pin 10a on the bracket 10 while the wire 39 is fixedly connected with a locking pin 15a on the bracket 15.

A plurality of bearings $13a$, $13a_1$, $13b$, $13b_1$ are formed on the side plate 13, and the bearings $13a$, $13b$ are threaded. A displacement shaft 18 extends through the bearings 13a, 13a₁ while another displacement shaft 19 extends through the bearings 13b, 13b₁. The upper end 18a, 19a of the displacement shafts 18, 19 are threaded for threadable engagement with the bearings 13a, 13b. The displacement shafts 18, 19 are parallel to each other and form an angle of $\theta_O/2$ with respect to the y-axis as shown in FIG. 7, extending downwardly and to the right. These displacement shafts 18, 19 are rotatably carried by supports 20, 21 which are fixedly mounted on a stationary member of the machine. Sprocket wheels 23, 24 are fixedly mounted on the lower end of the displacement shafts 18, 19, and are connected through a chain with a drive force, not shown.

During the slitwise exposure of the photosensitive member, the drive shaft 30 is driven for rotation in the counterclockwise direction, whereby the reflecting mirrors A, B move in given directions to effect a slitwise exposure of the photosensitive member. The diameter of the drive pulleys 31, 32 is determined in accordance with the speed of movement of the reflecting mirrors A, B.

In order to displace the reflecting mirrors A, B as the magnification is changed, the drive source, not shown, drives the sprokect wheels 23, 24 through the chain 25, thus rotating the displacement shafts 18, 19. The upper threaded end of the displacement shafts 18, 19 then coact with the threaded bearings 13a, 13b to cause a translational movement of the reflecting mirrors A, B together with the side plate 13 in a direction parallel to the displacement shafts 18, 19.

It should be understood that the described mechanism can be applied to other embodiments shown in FIGS. 4, 8 and 9 as well as the arrangement of FIG. 2, by merely changing the directions in which the guide bars 11, 16 extend.

In the embodiments described above, the reflecting mirrors A, B have different travels and hence different speed of movement. In the description to follow, an arrangement will be considered which permits the same travel and the same speed of movement to be employed for the reflecting mirrors A, B, assuming of course that they move in different directions.

As a starting point, the arrangement of FIG. 4 will be considered. In the embodiment of FIG. 4, the travels $S_{M10}$, $S_{M20}$ of the reflecting mirrors A, B for a magnification m are given as follows:

$$S_{M10} = \frac{m(S_0 + S_1)}{2\cos\left(\frac{\theta_0}{2}\right)} \cdot \sin(\theta_A - \tfrac{1}{2}\theta_0)$$

$$S_{M20} = \frac{m(S_0 + S_1)}{2\cos\left(\frac{\theta_0}{2}\right)} \cdot \sin(\theta_B + \tfrac{1}{2}\theta_0)$$

It will be understood that when the reflecting mirrors A, B have an equal travel, their speed of movement will be equal to each other. In other words, this is expressed mathematically as $S_{M10} = S_{M20}$, which prevails when $\theta_A - \tfrac{1}{2}\theta_0 = \theta_A + \tfrac{1}{2}\theta_0$ or $\theta_A - \theta_B = \theta_O$. Stated differently, the same travel and the same speed of movement for the reflecting mirrors A, B can be achieved when the orientation of the reflecting mirrors A, B are chosen to attain this equality and these reflecting mirrors are caused to move in directions perpendicular to their respective specular surfaces. When so arranged, a drive mechanism for the reflecting mirrors A, B can be simplified, and both of the mirrors can be given with a common drive mechanism. In addition, an increase in the width of the specular surfaces of the reflecting mirrors A, B is avoided.

Figure 11:
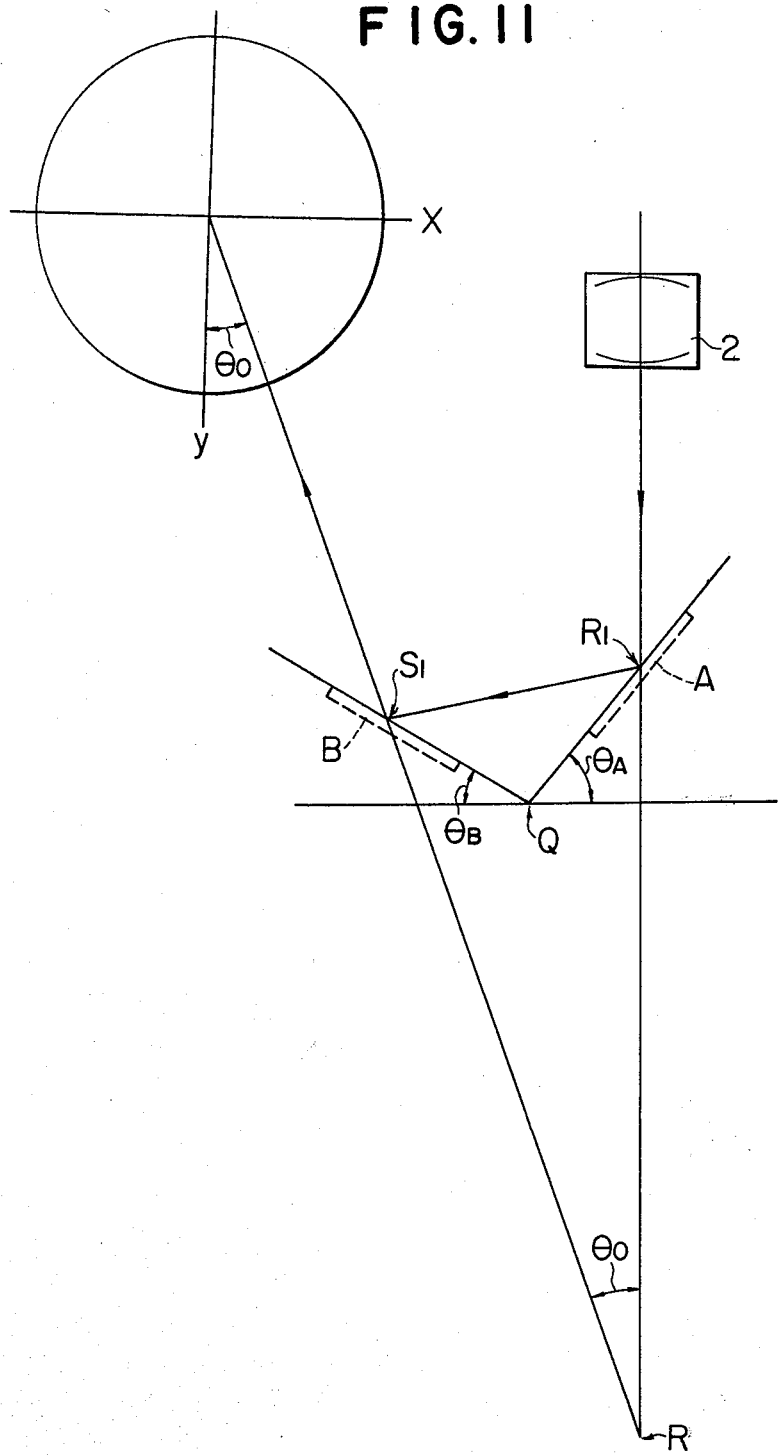
FIG. 11 is a schematic illustration of yet another embodiment of the invention.

Referring to FIG. 11, the relationship $\theta_A - \theta_B = \theta_O$ will be more specifically considered. In FIG. 11, a ray of light which passes through the optical axis of the focusing lens 2 impinges on the reflecting mirror A at point R₁, and then impinges on the reflecting mirror B at point S₁, and finally impinges on the photosensitive member 3 with an angle of $\theta_O$ with respect to the y-axis. Consequently, the angle of incidence of the ray to the reflecting mirror A is equal to $90° - \theta_A$. Choosing points, O, Q and R as shown, it will be seen that $\angle PR_1Q = 90° - \theta_A$, $\angle QR_1S_1 = 90° - \theta_A$, by the rule of reflection. Consequently, $\angle RR_1S_1 = 2(90° - \theta_A)$. On the other hand, the angle formed between a line segement $\overline{OS_1}$ and the specular surface of the reflecting mirror B is equal to $90° - \theta_0 - \theta_B$. Consequently, $\angle RS_1Q = \angle QS_1R_1 = 90° - \theta_0 - \theta_B$. It then follows that $<RS_1R_1 = 2(90° - \theta_O - \theta_B)$.

Considering the sum of the interior angles of the triangles $RS_1R_1$, $\angle RR_1S_1 + \angle RS_1R_1 + \theta_O = 180°$. Hence, $2(90° - \theta_A) + 2(90° - \theta_O - \theta_B) + \theta_O = 180°$. That is, $\theta_A + \theta_B = 90° - \theta_O/2$. By combining this relationship with the equality $\theta_A - \theta_B = \theta_O$, the elimination of $\theta_O$ results in the following equality:

$$3\theta_A + \theta_B = 180°$$

In general, $\theta_O$ is determined as a matter of design, and hence the orientation of the reflecting mirrors A, B can be determined so as to satisfy the requirement that $3\theta_A + \theta_B = 180°$. By way of example, for $\theta_O = 20°$, the choice of $\theta_A = 50°$ and $\theta_B = 30°$ satisfies the above requirement. At this time, the reflecting mirrors A, B move in directions which are perpendicular to their respective specular surfaces, with their travel and speed of movement being equal to each other.

Figure 12:
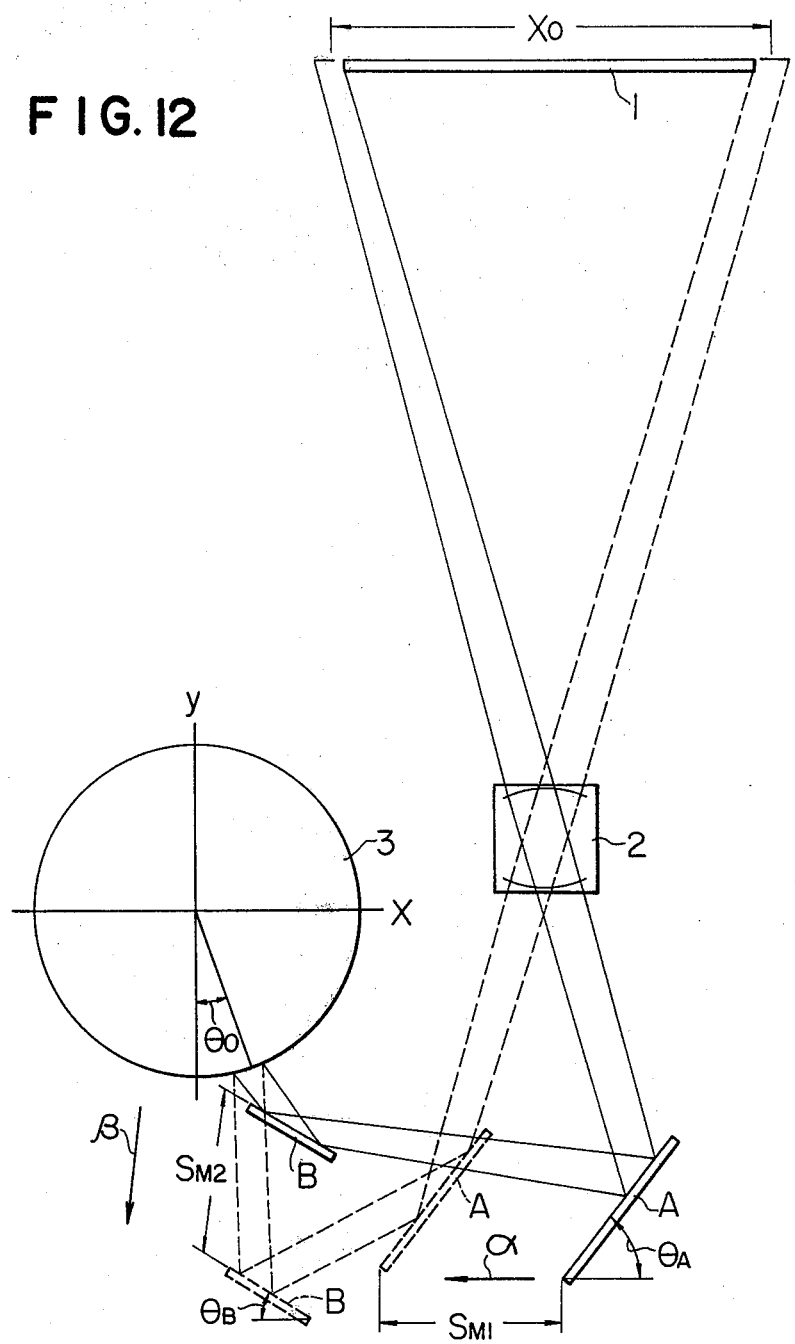
FIG. 12 is a front view of yet further embodiment of the invention.

Another arrangement will now be considered in which the reflecting mirrors A and B have the same travel and the same speed of movement for an embodiment such as that shown in FIGS. 3 and 7 where the reflecting mirror A moves in a direction parallel to the plane of the glass pane on which an original is placed, or parallel to the x-axis. A corresponding arrangement is depicted in FIG. 12.

Figure 13:
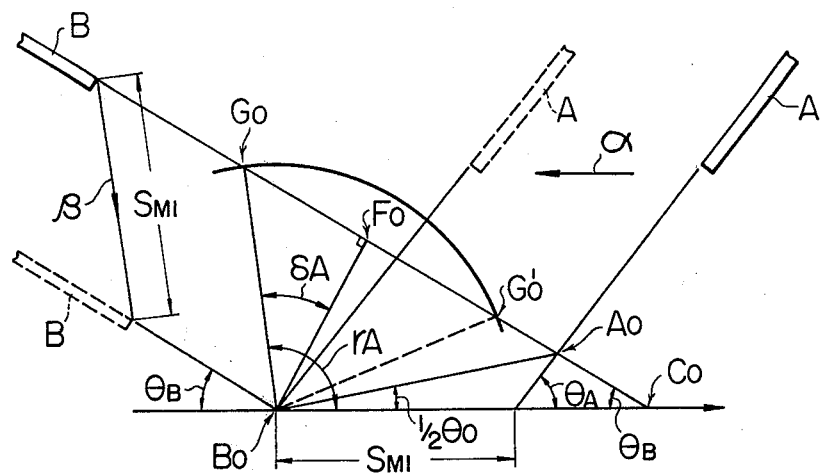
FIG. 13 is a schematic view illustrating the operation of the embodiment shown in FIG. 12.

The travel of the reflecting mirror A in this instance is given as follows:

$$S_{M10} = m(S_O + S_S)/2 \cdot (1 - \tan\theta_O 2/\tan\theta_A)$$

where m represents a magnification. In the embodiment being considered, the reflecting mirror B should move through the same travel as $S_{M10}$. A problem then remains of determining in which direction the reflecting mirror B should move to achieve this end. In FIG. 2, m is chosen equal to 1. In this instance, $S_{M1} = S_{M2}$. The determination of the direction in which the reflecting mirror B should move in this instance will be considered with reference to FIG. 13.

As shown, it is assumed that the extensions of the specular surfaces in the start position of the reflecting mirrors A, B intersect with each other at point $A_O$, and the extensions of the specular surfaces insertect with each other in the stop positions of the mirrors at a point $B_O$. A point $C_0$ represents the point of intersection between the x-axis extending through the point $B_O$ and the extension of the specular surface of the reflecting mirror B at its start position. An arc of a circle having a radius equal to a length $S_{M1}$ is struck from the point $B_O$, and intersects with the extension of the specular surface of the reflecting mirror B at its start position at points $G_O$, $G_O'$. A perpendicular is drawn from the point $B_O$ to a line segment $\overline{G_O G_O'}$, and intersects with the latter at a point $F_O$. In this instance, the reflecting mirror B may move in a direction parallel to a line segment $\overline{G_O B_O}$ or in a direction parallel to a line segment $\overline{G_O' B_O}$, but it is assumed here that it moves in a direction parallel to the line segment $\overline{G_O B_O}$.

Assuming that the line segment $\overline{G_O B_O}$ forms an angle $\gamma A$ with the x-axis, the determination of the value $\gamma A$ decides the direction in which the reflecting mirror B should move. Denoting $\angle F_O B_O G_O = \delta A$, $\cos \delta A = -\overline{B_O F_O}/\overline{B_O G_O}$, or $\delta A = \cos^{-1}(\overline{B_O F_O}/\overline{B_O G_O})$. Since $\angle B_O A_O F_O = \theta_B + \theta_O/2$, $\overline{A_O B_O}$ is equal to $S_M$ shown in FIG. 1, and $S_M = (S_O + S_s/2) \cos(\theta_O/2)$, considering a triangle $A_O B_O F_O$, we have $$\sin\left(\theta_B + \frac{\theta_0}{2}\right) = \frac{\overline{B_O F_O}}{\overline{A_O B_O}} = \frac{\overline{B_O F_O}}{(S_0 + S_S)/2 \cos\left(\frac{\theta_0}{2}\right)}.$$

From the equations defining $S_{M1}$, $\delta A$, $\sin(\theta_A + \theta_O/2)$, we have $$\delta A = \cos^{-1}\left[\frac{\sin\left(\theta_B + \frac{\theta_0}{2}\right)}{\cos\frac{\theta_0}{2}\left(1 - \frac{\tan\frac{\theta_0}{2}}{\tan\theta_A}\right)}\right]$$

On the other hand, since $\angle A_O B_O F_O = 90° - \theta_B - \theta_O/2$, $$\gamma A = 90° - \theta_B \pm \cos^{-1}\left[\frac{\sin\left(\theta_B + \frac{\theta_0}{2}\right)}{\cos\frac{\theta_0}{2}\left(1 - \frac{\tan\frac{\theta_0}{2}}{\tan\theta_A}\right)}\right]$$

In this manner, the direction in which the reflecting mirror B should be moved is determined.

Figure 14:
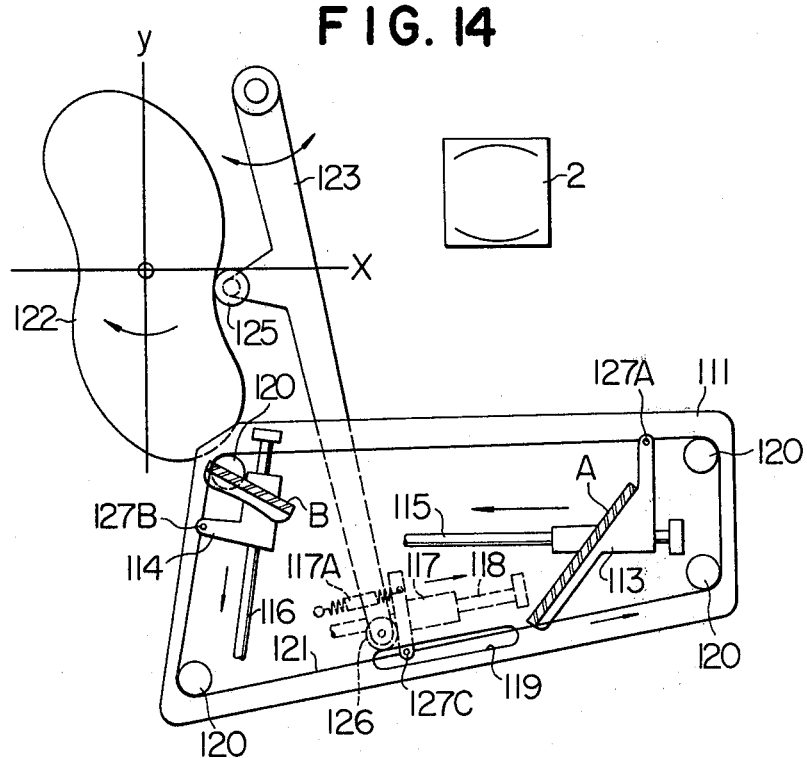
FIG. 14 is a front view of a reflecting mirror translating mechanism which is used in the embodiment shown in FIG. 12.

FIG. 14 shows a mechanism which may be used to move the reflecting mirrors A, B for the embodiment shown in FIG. 12. The mechanism includes a side plate 111 on which a plurality of guide bars 115, 116, 118 are fixedly mounted in given orientations. The guide bar 115 guides the movement of the reflecting mirror A in a direction parallel to the x-axis. The reflecting mirror A is fixedly mounted on the bracket 113 which is slidably mounted on the guide bar 113. The guide bar 116 guides the movement of the reflecting mirror B, and hence has its orientation chosen so that the reflecting mirror B can be moved in a direction which is determined in the manner described in the preceding paragraphs. The reflecting mirror B is fixedly mounted on a bracket 114 which is slidably mounted on the guide bar 116. The guide bar 118 has its orientation chosen so that it forms an angle of $\theta_O/2$ with respect to the x-axis, considering the displacement of the entire side plate 101 when a magnification is changed, in order to guide the movement of a slider 117.

Pulleys 120 are mounted on the four corners of the side plate 111, and a wire 121 around these pulleys. The wire 121 is formed of a non-flexible material, and is connected to the brackets 113, 114 and the slider 117 by means of locking pins 127A, 127B, 127C, respectively. The connecting pin 127C on the bracket 117 extends through an elongate slot 119 formed in the side plate 111 from its rear to its front side, and is connected to the wire 121 on the front side of the side plate 111.

An arm 123 has its one end pivotally mounted on the stationary member of the machine, and rotatably carries a cam follower 125, intermediate its length, which bears against the peripheral surface of a cam 122. A slider roller 126 is rotatably mounted on the other end of the arm 123 for abutment against the slider 117. A tension spring 117A extends between the slider 117 and the side plate 111, and serves returning the slider 117.

In operation, during a slitwise exposure, the cam 122 is driven for rotation in a direction indicated by an arrow, whereby the arm 123 is driven through the cam follower 125 to rotate counterclockwise. This causes the slider roller 126 to urge the slider 117 in a direction indicated by an arrow, thus moving the reflecting mirrors A, B in given directions, but with a same speed. Upon completion of the movement of both of the reflecting mirrors, the latter return to their start positions under the resilience of the spring 117. It will be noted that the cam 122 has a minimum and a maximum radius each at two locations. Hence, one revolution of the cam 122 is effective to cause two reciprocating motions of the reflecting mirrors A, B.

When this mechanism is employed, as a copying magnification is changed, the reflecting mirrors A, B are displaced, together with the side plate 111, in a direction which forms an angle of $\theta_O/2$ with respect to the y-axis, or in a direction perpendicular to the guide bar 118. However, the abutting relationship between the arm 123 and the slider 117 remains unchanged as does the arm length of the arm 123, so that a change in the magnification can be accommodated for by determining the length of the abutting surface of the slider roller 126 in consideration of the displacement.

It will be understood that, by changing the orientations of the guide bars 115, 116, the described mechanism can be used for other embodiments mentioned above in which the reflecting mirrors A, B are moved in directions perpendicular to their respective specular surfaces at a common speed.

What is claimed is:

1. A method of slitwise exposure for a photosensitive member in copying machines comprising the steps of placing an original to be copied at a given position in planar form, disposing a focusing lens at a given location and in a given orientation so as to correspond to a full effective copying region of an original receptable, disposing a pair of rectangular reflecting mirrors on the image side of the focusing lens with their specular surfaces disposed at locations and orientations such that part of the exposing light flux from the focusing lens is successively reflected by the reflecting mirrors to focus a light image of the original on a photosensitive member, and moving the reflecting mirrors in different given directions while moving the surface of the photosensitive member in a direction at a uniform rate, thus effecting a slitwise exposure of the photosensitive member, in which the directions in which the pair of reflecting mirrors are moved are chosen so as to reduce the width of the specular surfaces of the reflecting mirrors, said mirrors being disposed at an obtuse angle relative one another.

2. A method according to claim 1 in which the directions in which the pair of reflecting mirrors are moved are perpendicular to their respective specular surfaces.

3. A method according to claim 1 in which one of the reflecting mirrors of the pair which is the first to reflect exposing light flux moves in a direction parallel to the plane of the original receptacle, and in which the other reflecting mirror moves in a direction perpendicular to the specular surface thereof.

4. A method of slitwise exposure for a photosensitive member in copying machines comprising the steps of placing an original to be copied at a given position in planar form, disposing a focusing lens at a given location and in a given orientation so as to correspond to a full effective copying region of an original receptacle, disposing a pair of rectangular reflecting mirrors on the image side of the focusing lens with their specular surfaces disposed at locations and orientations such that part of exposing light flux from the focusing lens is successively reflected by the reflecting mirrors to focus a light image of the original on a photosensitive member, and moving the reflecting mirrors in different given directions while moving the surface of the photosensitive member in a direction at a uniform rate, thus effecting a slitwise exposure of the photosensitive member, in which the directions in which the pair of reflecting mirrors are moved are chosen so as to reduce the width of the specular surfaces of the reflecting mirrors, and further in which the position of the focusing lens as well as the start positions of the pair of reflecting mirrors are displaced in response to a change in a copying magnification.

5. A method according to claim 4 in which the displacement of the start positions of the pair of reflecting mirrors takes place in an integral manner.

6. A method according to claim 4 in which the displacement of the start positions of the pair of reflecting mirrors takes place separately for each reflecting mirror.

7. A method according to claim 5 in which one of the reflecting mirrors of the pair which is the first to reflect exposing light flux moves in a direction parallel to the plane of the original receptacle, and in which the other reflecting mirror moves in a direction perpendicular to the specular surface thereof.

8. A method according to claim 6 in which the pair of reflecting mirrors move in directions perpendicular to their respective specular surfaces, and in which the displacement of their start position occurs in direction perpendicular to their respective specular surfaces.

9. A method according to claim 6 in which one of the reflecting mirrors of the pair which is the first to reflect the exposing light flux moves in a direction parallel to the plane of the original, and in which the other reflecting mirror moves in a direction perpendicular to the specular surface thereof, and wherein the displacement of their start positions takes place in directions parallel to their respective direction of movement.

10. A method of slitwise exposure for a photosensitive member in copying machines comprising the steps of placing an original to be copied at a given position in planar form, disposing a focusing lens at a given location and in a given orientation so as to correspond to a full effective copying region of an original receptacle, disposing a pair of rectangular reflecting mirrors on the image side of the focusing lens with their specular surfaces disposed at locations and orientations such that part of exposing light flux from the focusing lens is successively reflected by the reflecting mirrors to focus a light image of the original on a photosensitive member, and moving the reflecting mirrors in different given directions while moving the surface of the photosensitive member in a direction at a uniform rate, thus effecting a slitwise exposure of the photosensitive member, in which the directions in which the pair of reflecting mirrors move are chosen to provide an equal travel for each reflecting mirror, said mirrors being disposed at an obtuse angle relative one another.

11. A method according to claim 10 in which the pair of reflecting mirrors move in directions perpendicular to their respective specular surfaces.

12. A method according to claim 10 in which one of the reflecting mirrors of the pair which is the first to reflect the exposing light flux moves in a direction parallel to the plane of the original receptacle.

13. A method of of slitwise exposure for a photosensitive member in copying machines comprising the steps of placing an original to be copied at a given position in planar form, disposing a focusing lens at a given location and in a given orientation so as to correspond to a full effective copying region of an original receptacle, disposing a pair of rectangular reflecting mirrors on the image side of the focusing lens with their specular surfaces disposed at locations and orientations such that part of exposing light flux from the focusing lens is successively reflected by the reflecting mirrors to focus a light image of the original on a photosensitive member, and moving the reflecting mirrors in different given directions while moving the surface of the photosensitive member in a direction at a uniform rate, thus effecting a slitwise exposure of the photosensitive member, in which the directions in which the pair of reflecting mirrors move are chosen to provide an equal travel for each reflecting mirror, and further in which the position of the focusing lens as well as the start positions of the pair of reflecting mirrors are displaced in response to a change in a copying magnification and in which the displacement of the start position takes place in common for the pair of reflecting mirrors.

14. A method according to claim 1 or 10 in which the entire effective copying region is illuminated with a given distribution of illumination.

15. A method according to claim 1 or 10 in which the effective copying region is scanned by a slitwise illumination by an illuminating optical system in synchronized relationship with the movement of the surface of the photosensitive member.

16. An apparatus for performing a slitwise exposure of the surface of a moving photosensitive member at a given location, comprising:
   a glass pane stationary in the space of a copying machine and on which an original to be copied is placed in planar form,
   illumination means for illuminating an original placed on the glass pane,
   a focusing lens stationary in the space of the machine for focusing a light image of the original on a slitwise exposure station,
   a pair of reflecting mirrors disposed on an exposure light path between the focusing lens and the slitwise exposure station at a given angle relative to each other for conveying imaging light flux from the focusing lens to the slitwise exposure station, two sets of guide devices for guiding the pair of reflecting mirrors for movement along different given directions, and a drive mechanism for moving the pair of reflecting mirrors along the guide devices at given speeds which are synchronized with the speed of movement of the surface of the photosensitive member, said mirrors being disposed at an obtuse angle relative one another.

17. An apparatus according to claim 16 in which the guide devices for guiding the pair of reflecting mirrors each comprise a guide bar and a bracket.

18. An apparatus for performing a slitwise exposure of the surface of a moving photosensitive member at a given location, comprising:

a glass pane stationary in the space of a copying machine and on which an original to be copied is placed in planar form, illumination means for illuminating an original placed on the glass pane, a focusing lens stationary in the space of the machine for focusing a light image of the original on a slitwise exposure station, a pair of reflecting mirrors disposed on an exposure light path between the focusing lens and the slitwise exposure station at a given angle relative to each other for conveying imaging light flux from the focusing lens to the slitwise exposure station, two sets of guide devices for guiding the pair of reflecting mirrors for movement along different given directions, and a drive mechanism for moving the pair of reflecting mirrors along the guide devices at given speeds which are synchronized with the speed of movement of the surface of the photosensitive member, in which the guide devices for guiding the pair of reflecting mirrors each comprise a guide bar and a bracket, and further in which the drive mechanism for moving the pair of reflecting mirrors comprises a pair of side plates on which the two sets of guide devices are mounted, two sets of translating mechanisms disposed on at least one of the side plates and each including a wire which is connected to each of the brackets and pulleys, and means for causing the translating mechanisms to drive the pair of reflecting mirrors for movement at different speeds of movement.

19. An apparatus according to claim 18 in which said means for causing the translating mechanism to drive the pair of reflecting mirrors for movement at different speeds of movement comprises pulleys of different diameters, and fixedly mounted on a drive shaft in concentric manner, the wire of each drive mechanism extending around one of these pulleys.

20. An apparatus according to claim 18 in which a pair of displacement shafts are threadably mounted on the pair of side plates and rotatably disposed thereon while extending parallel to each other, each of the displacement shafts carrying a sprocket wheel fixedly mounted on one end thereof which is engaged by a chain, thereby allowing both of the displacement shafts to be driven simultaneously for rotation with an equal angular speed, the pair of displacement shafts causing a translational movement of the pair of reflecting mirrors in a given direction in response to a change in a copying magnification.

21. An apparatus according to claim 17 in which the drive mechanism comprises a pair of side plates on which guide devices associated with the pair of reflecting mirrors are mounted, a plurality of pulleys mounted on the side plates, a wire extending around the plurality of pulleys and connected to a carriage for causing a movement of the pair of reflecting mirrors along the guide devices, a slider connected to the wire, a guide shaft fixedly mounted on the side plates for guiding the movement of the slider, a cam adapted to be driven by a drive source, an arm carrying a cam follower and disposed for pivotal motion about a pivot thereof in accordance with the rotation of a cam which is transmitted thereto through the cam follower, the free end of the arm being effective to cause a movement of the slider in a given direction, and a tension spring extending between the slider and the side plate for returning the slider.

* * * * *